United States Patent
Hubschneider et al.

(10) Patent No.: US 6,853,915 B2
(45) Date of Patent: Feb. 8, 2005

(54) MOTOR VEHICLE NAVIGATION SYSTEM THAT RECEIVES ROUTE INFORMATION FROM A CENTRAL UNIT

(75) Inventors: Hans Hubschneider, Karlsruhe (DE); Michael Ruf, Malsch (DE)

(73) Assignees: Harman Becker Automotive Systems GmbH, Karlsbad (DE); PTV Planung Transport Verkehr AG, Karlsruhe (DE)

( * ) Notice: Subject to any disclaimer, the term of this patent is extended or adjusted under 35 U.S.C. 154(b) by 0 days.

(21) Appl. No.: 09/953,624

(22) Filed: Sep. 12, 2001

(65) Prior Publication Data

US 2002/0091486 A1 Jul. 11, 2002

(30) Foreign Application Priority Data

Sep. 12, 2000 (DE) .......................................... 100 44 889

(51) Int. Cl.⁷ ............................................... G01C 21/26
(52) U.S. Cl. ...................... 701/209; 701/210; 701/201; 340/995.23; 340/905; 379/111
(58) Field of Search ................................. 701/201, 202, 701/209, 210, 211; 340/990, 995, 992, 993, 905, 902; 455/456, 457, 507, 517; 379/111, 112.08, 133, 134, 136

(56) References Cited

U.S. PATENT DOCUMENTS

| | | | | |
|---|---|---|---|---|
| 5,428,545 A | * | 6/1995 | Maegawa et al. | 701/210 |
| 5,689,252 A | * | 11/1997 | Ayanoglu et al. | 340/991 |
| 5,875,412 A | * | 2/1999 | Sulich et al. | 701/207 |
| 5,919,246 A | * | 7/1999 | Waizmann et al. | 701/209 |
| 5,933,100 A | * | 8/1999 | Golding | 340/995 |
| 6,061,625 A | * | 5/2000 | Fastenrath | 701/117 |
| 6,092,020 A | * | 7/2000 | Fastenrath et al. | 701/119 |
| 6,098,016 A | | 8/2000 | Ishihara | 701/209 |
| 6,202,024 B1 | * | 3/2001 | Yokoyama et al. | 701/207 |
| 6,240,364 B1 | * | 5/2001 | Kerner et al. | 701/210 |
| 6,282,491 B1 | | 8/2001 | Bochmann et al. | 701/209 |
| 6,317,684 B1 | * | 11/2001 | Roeseler et al. | 701/202 |
| 6,426,709 B1 | | 7/2002 | Becker et al. | 340/992 |
| 6,438,561 B1 | * | 8/2002 | Israni et al. | 707/104.1 |
| 6,480,783 B1 | * | 11/2002 | Myr | 701/117 |
| 6,707,421 B1 | * | 3/2004 | Drury et al. | 342/357.1 |

FOREIGN PATENT DOCUMENTS

| | | |
|---|---|---|
| DE | 195 19 066 | 5/1995 |
| DE | 198 24 272 | 5/1998 |

* cited by examiner

Primary Examiner—Tan Q. Nguyen
(74) Attorney, Agent, or Firm—Gauthier & Connors LLP

(57) ABSTRACT

Data indicative of an instantaneous location, a destination and a route from the instantaneous location to the destination are transmitted from a motor vehicle navigation unit to a central unit. Traffic information about the route between the instantaneous location and the destination are transmitted from the control unit to the vehicle unit. The received traffic information data are used by the vehicle unit to determine a desirable route between the instantaneous location and the destination given the traffic information. The data of the route thus determined are made available to the vehicle driver, so that he is able to steer toward his desired destination along this specified route.

13 Claims, 3 Drawing Sheets

MOTOR VEHICLE NAVIGATION SYSTEM THAT RECEIVES ROUTE INFORMATION FROM A CENTRAL UNIT

BACKGROUND OF THE INVENTION

The present invention relates to the field of motor vehicle navigation systems, and in particular to a technique for determining a route between the instantaneous location of the motor vehicle and the destination of the motor vehicle.

Known motor vehicle navigation systems often include centrally stored traffic information indicative of a traffic network. This information is retrieved by a vehicle, according to certain criteria, in order to determine the vehicle's optimum route to its destination. A problem with this technique is that the centrally stored traffic information is often insufficient in quantity and quality to properly determine the vehicle's optimum route.

One proposed technique for reducing this problem is to receive traffic information (i.e., floating car data) from moving vehicles to supplement the centrally stored traffic information. This technique is premised on the idea that the vehicles themselves recognize traffic conditions and report these conditions to a central location. The central location processes and combines these condition messages and makes the result indicative of the traffic situation available to motor vehicle receivers. However, experience of recent years has shown that this technique has not been successful for at least several reasons.

One problem is that previous formulations of the floating car data were based on the telematic protocol GATS. However, up to now, too few terminal devices were available for this. Another problem was that the floating car data (FCD) range of the GATS protocol was not generally accessible. In addition, the previously used FCD techniques led to extremely high communication costs, since feedback of the traffic situation to the FCD vehicles was hardly possible. The FCD method becomes effective only with high penetration of the vehicle population which carries the appropriate electronic equipment. The build-up to full coverage is as yet not in prospect.

Extrapolation of the communication costs to generate FCD data yielded such large amounts that reciprocal financing by telematic services was questionable. This is true all the more so since telematic services are not being used to the extent that was expected. Consequently, they cannot make the relevant profits that would have permitted reciprocal financing.

Furthermore, the FCD method is subject to data protection. If it were introduced as standard equipment, privacy advocates my decry such a system has an intrusion on personal privacy.

Therefore, there is a need for a system that enables acquisition of current traffic conditions while economically improving navigation and destination guidance using up-to-date traffic/situational data.

SUMMARY OF THE INVENTION

Briefly, according to an aspect of the present invention, data indicative of an instantaneous location, a destination and a route from the instantaneous location to the destination are transmitted from a motor vehicle navigation unit to a central unit. Traffic information about the route between the instantaneous location and the destination are transmitted from the control unit to the vehicle unit. The received traffic information data are used by the vehicle unit to determine a desirable route between the instantaneous location and the destination given the traffic information. The data of the route thus determined are made available to the vehicle driver, so that he is able to steer toward his desired destination along this specified route. It is likewise necessary that he be kept informed about his current position.

Data about the current route (e.g., the start-destination relation) are transmitted to the control unit and stored in a central traffic information data memory, and thus traffic information/segment times/possibly historical data are queried about this route. As a response to the transmitted data, traffic information data about the current route are delivered to the vehicle unit. These delivered traffic information data are then used again, to determine the route within the traffic network between the instantaneous location and the destination. The request of traffic information data from the central traffic information data memory of the control unit is thus linked to the traffic information data being made available from the route currently traversed by the vehicle to the central traffic information data memory, which accepts it into its data inventory, possibly with preselection. This ensures that the central unit is supplied with the most current information, and that the vehicle driver receives the most current information about the route segment before him. One use of this information is to calculate a new estimated time of arrival (ETA) or to determine an alternative to the planned route if there are significant traffic obstacles.

Data about the current route, and data about previous drives are also transmitted to the central traffic information data memory. Through these data, the information database can be successively built up with data about the traffic history. The history data can include, for example, start and destination locations, driving times along previously driven routes, information about road conditions, etc. In the simplest case, the previous drives include the previous progress of the current trip, but information about previous trips can also be made available. Such information makes it possible for the central unit to make statistical analyses, such as for example the traffic density at particular times of the day or at particular weekdays, or traffic relations between particular locations. This information naturally is then available for future inquiries by vehicle units.

In addition to data about the current route and in addition or alternatively to the data about the progress of previous trips, data about supplementary information are also transmitted to the central unit. Such data about supplementary information can also be notices directly input by the driver. Especially suited for this are simple conditions such as "running into a jam," "exiting a jam," "jam on the other side of the road." Messages about radar traps or speed controls can also be transmitted. In particular, such a procedure also is conceivable as an alternative to the usual "traffic jam report" via voice telephone, with considerably lower costs and simpler operation.

The data about the current route and the data about the calculated route can be compared and, if there is a difference, these data are shown to the driver. This includes not only a difference from the route itself, but also a difference from the expected time of arrival or the like. In this way, the driver can take any necessary action, or, for example, can inform the person waiting at the destination.

Transmission of the data to the control unit can be initiated manually. The transmitted data may include information indicative of the current route, previous routes, or also supplementary information. Manually initiated transmission of data and the associated request of traffic information data from the central traffic information data memory of the central unit is especially advantageous when the driver has been informed about a deviation from the current route. It also makes sense when an unusual traffic condition has been recognized in the course of the trip, such as for example running into a traffic jam or exiting from a traffic jam. Of course, such a request need not necessarily result in the determination of an alternative route. It can also result merely in the calculation of a new expected time of arrival.

The transmission of the data to the central unit may be automatically initiated. One advantage of automatic transmission of data to the central unit is that the driver himself need not constantly be actively informed about every detail of the current route or actively monitor the current route. Advantageously, changes which develop in the course of the trip but concern only an unusual traffic condition far removed along the expected route are detected early, and appropriate countermeasures can be initiated. Of course, on the one hand this condition can be communicated to the driver and, on the other hand, it can also automatically trigger a new determination or calculation of the route.

It can also be appropriate, especially for trips into areas of dense traffic or for longer trips, to make further inquiries to the central traffic information data memory automatically. Data can be automatically transmitted cyclically, and thus traffic information data are delivered cyclically from the central traffic information data memory. Cyclic data transmission means data transmitted at regular intervals, thus initiating a transmission of traffic information data, or that such a transmission is initiated after a certain distance has been traversed. A closed control loop (central traffic information data memory—route calculation—calculation of data about the current route, especially position data and acquisition of traffic conditions—traffic information data memory), enables a control unit situated centrally or in the vehicle itself to determine criteria according to which a new data transfer of status information will be initiated. These criteria can be determined, for example, also on the basis of history data. Technically it is also possible to control the frequency of cyclic queries by transmitting a hindrance probability. This can achieve a service quality comparable to active accompaniment by the central traffic information data memory. The cyclic repetition function preferably should be selected or at least configured in principle at the first data transmission to the traffic information data memory.

Data can also be transmitted at fixed prescribed locations. Such locations can be, for example, decision points which allow the driver various alternative routes. Furthermore, such points can also be where traffic build-ups frequently occur or where hazardous weather frequently occurs, such as fog, precipitation, or snow. Such points can be specified for example, on the basis of history data. Here, too, it is possible to control the number of locations along a route segment at which data are transmitted by transmitting a hindrance probability.

The system may also be set-up in an arbitrary configuration, such that transmission of data takes place cyclically or at fixed prescribed locations. In this connection, it is important to ensure that as an alternative to automatic repetition, the driver at any time can initiate manual data transmission. This can be enabled, for example, by simply pressing a key in the vehicle unit. This capability is especially appropriate, for example, if the driver is notified of a newly-arrived, relevant traffic jam report (e.g., via RDS or TMC) so that a driver will be able to verify this.

The data about the current route and the data about the calculated route can be compared, and the transmission of data takes place on the basis of a difference between the current route and the calculated route. This ensures that the driver is guided to his destination even if he deviates from the initially planned route due to his own independent decision or by mistake. This presupposes that the criteria for initiating data transmission can be freely configured. Furthermore, the driver can configure whether automatic data transmission is permitted or whether he wishes to initiate data transmission manually on the basis of his available data about the current route and the calculated route.

The route may be calculated in the vehicle unit. This has the advantage that a navigation system present in the vehicle can be used. It is also possible that this navigation system first calculates a route, and that this route is transmitted to the central unit. The route is described on a suitable, specified level of detail. Such levels of detail can be so-called link IDs, node coordinates, or intermediate route points. These intermediate route points can be defined for example by the system operator himself or can be based on known standards such as alert-C. The central unit determines the travel times, speed, as well as special conditions such as traffic jams, waiting times at boundaries, etc., along the described route. The information is processed in accordance with the particular detailing level and is transmitted to the vehicle. The travel times and speeds are superposed on the chosen route, and are used to calculate the updated estimated time of arrival.

Alternatively, the route may be calculated by the central unit. This has the advantage that it is not absolutely necessary for a navigation system present in the vehicle to have local digital maps. These maps can be present in the central traffic information memory of the central unit, which furnishes to the vehicle unit only the maps necessary to guide the vehicle to its destination. Alternatively, it is also possible for the navigation system in the vehicle to transmit an image of its own digital map to the central unit, which uses this map material for destination guidance, and transmits the calculated route back to the vehicle.

The data may be transmitted by protocols such as for example WAP, HTTP, TCP/IP and transmission systems such as GSM, GPRS, or UMTS. An advantage is that communication and transaction costs can be accounted for rather simply, since costs are incurred only when information is actually requested, for example when data are transmitted automatically or when the driver himself actively requests an exchange of information. Since it is the vehicle that initiates data transmission, it is also possible to find accounting modes based on the transmitted information, which take into account the type of information. Thus, for example, it is possible to grant a credit for driver-initiated, active transmission of traffic conditions (e.g., traffic jam report), if the driver himself does not obtain additional information concerning his route. It is also desirable to make it impossible for the central unit to initiate a down-link. This ensures anonymity of the vehicle and thus of its driver.

Higher-grade telematic services can be included. Thus, for example, if trouble is present along the chosen route (e.g., if there is a traffic jam within a short distance, for example in less than an hour), travel time/speed for the main roads in the vicinity of the traffic problem can also be transmitted to the vehicle to facilitate a meaningful alternative route calculation in one step. This is especially suggested if the central unit calculates an optimum (alternative) route, which can be provided to the vehicle unit. For this, it must be possible to address the vehicle, and this requires the capability of imaging the digital maps used in the central unit and in the vehicle unit.

The exchange of information may be based for example on standards in accordance with alert-C. The intermediate route points are based, for example. on known locations or on tables defined by oneself.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
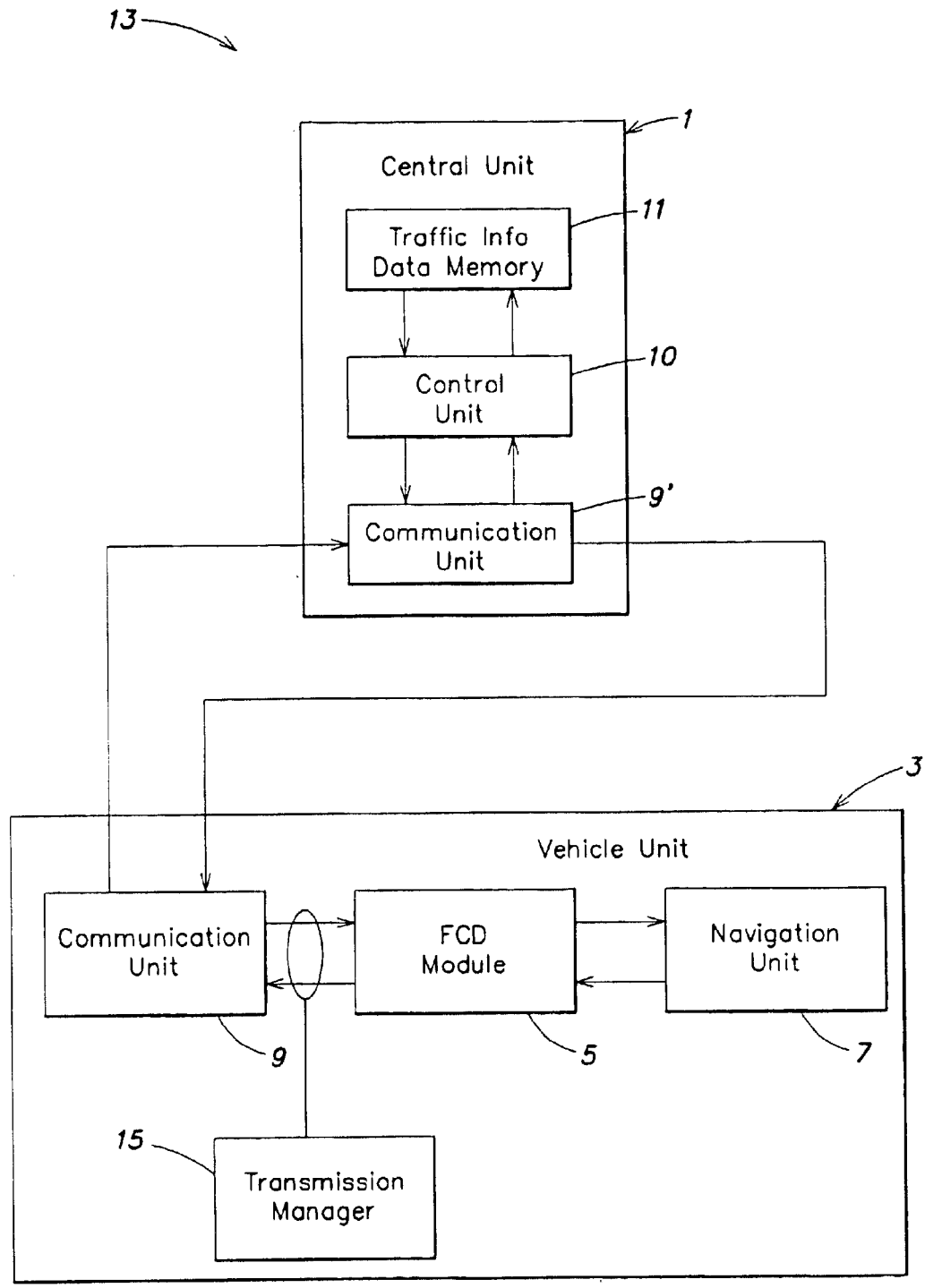
FIG. 1 illustrates a block diagram of a route calculation system.

FIG. 1 illustrates a block diagram of an inventive route calculation system 13. The system includes a central unit 1, whose location preferably is fixed, and a vehicle unit 3 situated in a vehicle.

The central unit 1 includes a traffic information data memory 11, and a control unit 10 that is responsible for selecting the traffic information relevant to the requested routes, the choice of reference points for new automatic inquiries, and the interpretation and analysis of the received information. The central unit 1 also includes a communication unit 9' to transmit and receive data. The traffic information data memory 11 is connected to the control unit 10 through a bidirectional connection, and the control unit 10 is also connected to the communication unit 9' through a bidirectional connection.

A vehicle unit 3 includes a communication unit 9 to transmit and receive data, a floating car data (FCD) module 5, a navigation unit 7, and a transmission manager 15. In this example, the communication unit 9 is connected to the transmission manager 15 through a bidirectional connection. The transmission manager 15 is bidirectionally connected to the FCD module 5 and to the communication unit 9, which conducts the data flow to the FCD module 5. The transmission manager 15 is responsible for bundling and distributing the data within the vehicle unit 3, and it regulates the communication volume between the vehicle unit 3 and the central unit 1.

The communication unit 9 of the vehicle unit 3 and the communication unit 9' of the central unit 1 are bidirectionally in contact through a mobile radio link. Of course, the communication unit 9' and the traffic information data memory 11 of the central unit 1, and the control unit 10 of the central unit 1 can be situated far apart.

The communication unit can use protocols such as, for example, WAP, HTTP, TCP/IP, or a comparable protocol. Transmission methods include for example, GSM, GPRS, or UMTS. An arbitrary recognition method is implemented in the FCD module 5.

The navigation unit 7 includes for example, a navigation computer, various digital circuit boards, a position finding system, such as, for example, GPS, various sensors, etc.

Figure 2:
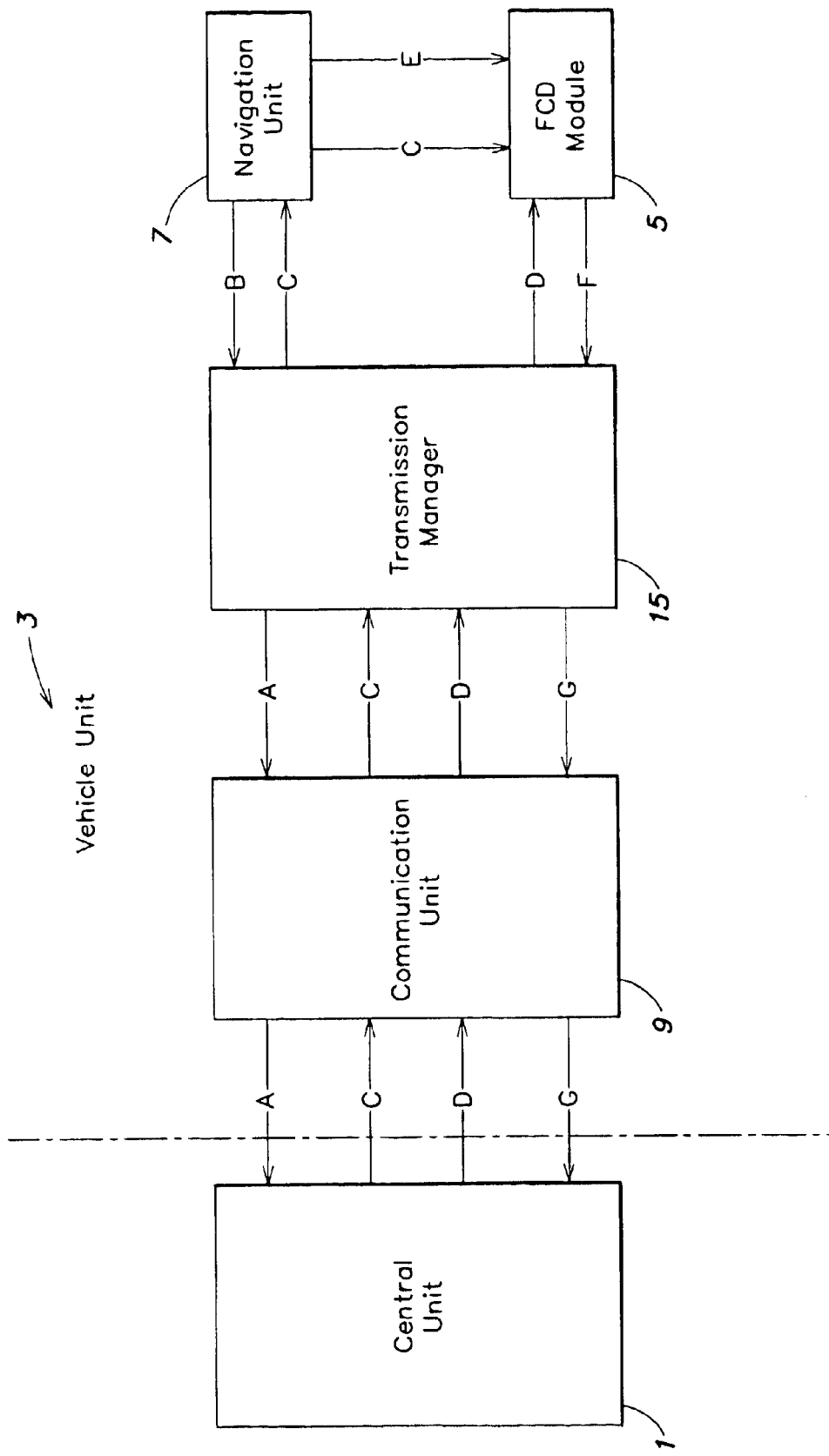
FIG. 2 illustrates a data flow diagram between components of the system illustrated in FIG. 1.

FIG. 2 illustrates various data communication between the central unit 1 that includes the traffic information data memory 11 (not shown), the communication unit 9, transmission manager 15, navigation unit 7, and the FCD module 5. The communication unit 9, the transmission manager 15, the navigation unit 7 and the FCD module 5 are preferably located in the vehicle unit 3. In the interest of clarity, the transmission of inquiry data or the like has been omitted. Furthermore, also for the sake of clarity, the communication units 9 and 9', which perform a transmission and reception function, have been omitted. The components are connected by appropriate data links or data lines as illustrated.

When the RTI process starts, the transmission manager 15 of the vehicle unit 3 transmits route information A, via the communication unit 9 to the central unit 1, and it requests current theoretical travel times from the central unit 1. Before this, the navigation unit 7 in the vehicle transmits a list B of route-relevant information to the transmission manager 15. The central unit 1 transmits theoretical travel times C and configuration files D to the communication unit 9 of the vehicle unit 3. The theoretical travel times C and configuration files D are transmitted to the transmission manager 15. The transmission manager 15 conducts the theoretical travel times C to the navigation unit 7, which calculates an updated route. The transmission manager 15 conducts the configuration files D to the FCD module 5. After the route has been updated, the navigation unit 7 transfers both the theoretical travel times C and current travel and location information E to the FCD module 5. The FCD module 5 sends the FCD information F to the transmission manager 15, which transmits the currently detected traffic situation and history data in a message G via the communication unit 9 to the central unit 1.

The communication volume associated with transmission of the messages G is limited by the transmission manager 15. Here, the ratio of requests A to messages G may not become less per request A or within a time unit. This ratio can be determined and changed by the central unit 1 via the configuration files D.

Figure 3:
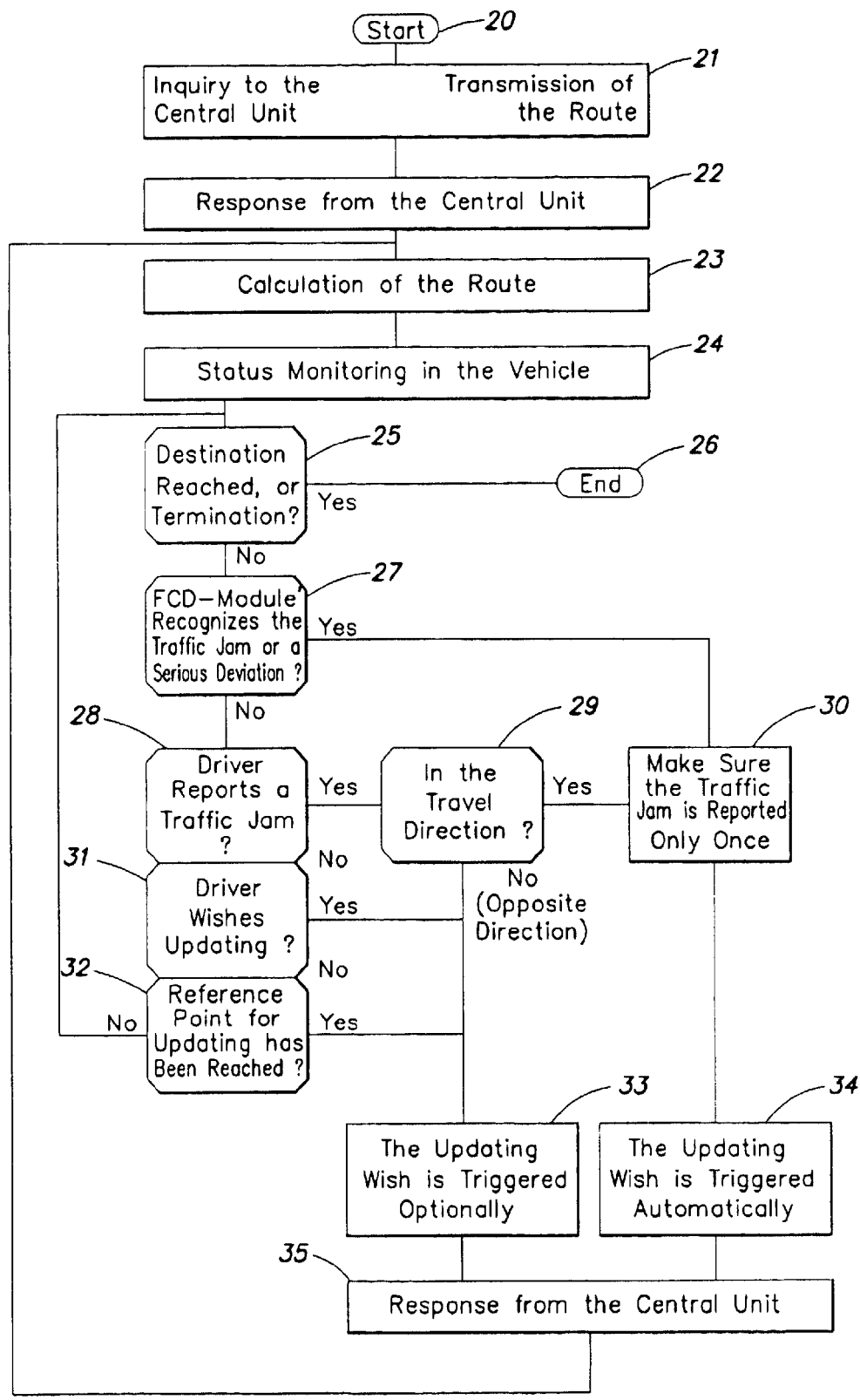
FIG. 3 illustrates a flowchart of processing steps performed by the route calculation system.

FIG. 3 demonstrates, by way of example, how a route planning process takes place in accordance with the present invention. First, the instantaneous location and the destination location are determined. The instantaneous location can be determined, for example, by the GPS system contained in the navigation unit 7. The destination location generally is defined by the driver himself. Now, for example, the navigation unit 7 plans a route to the destination. The process starts in step 20, and in step 21 an inquiry is sent by the vehicle unit 3 (FIG. 1) to the central unit 1, during which the route calculated by the navigation unit 7 of the vehicle unit 3 is transmitted.

The route can be transmitted, for example, in the form of a list of intermediate route points, such that segments of the route are transmitted from the vehicle unit 3 to the central unit 1 and defined by two intermediate route points. The traffic information data memory 11 of the central unit 1 contains the current and historical traffic situation data on segments between two intermediate route points. The data in the traffic information data memory 11 may be provided from the user of the inventive method and/or from other providers who furnish traffic data.

Once the planned route has been transmitted by the vehicle unit 3 to the central unit 1, the control unit 10 can make selections from this planned routed data stored in the traffic information data memory 11. This reduces the data quantity that must be transmitted to the vehicle unit 3. The particular selection method used in this connection is irrelevant to the method for route calculation itself.

Based on this data material, the central unit 1 transmits a response 22 to the vehicle unit 3. For example, the central unit 1 delivers the current road and traffic condition for the route, especially the time needed between each two reference points, traffic jam reports, additional traffic jam reports on possible alternative routes. For the latter, it is possible to use, for example, knowledge of the map basis used in the vehicle.

In addition, the central unit 1 delivers reference points at which the route information should be updated and/or the actual travel times recorded up to this point should be transmitted. These can be, for example, known points of slow traffic, areas made hazardous for example by fog, or route segments that can be traversed only at a reduced speed when there is rain or snow. Using this information from the central unit 1, the vehicle unit 3 calculates in step 23 an optimum route to the destination. In some circumstances, this will deviate from the original route. Furthermore, the current travel time can be determined.

A status monitoring process is then initiated in the vehicle in step 24. Thus, for example, the current travel time between two reference points is stored in the vehicle, to be transmitted to the central unit during the next contact. In addition, the current travel time is regularly compared with the travel times delivered by the central unit 1. If the difference in these times is large enough, the central unit 1 can be informed automatically about this difference. Alternatively, or in addition, the driver can be informed about this deviation in the travel time. The driver also has the ability to enable or disable the process of informing the central unit 1 of the deviation in the travel time.

The status monitoring process performed in step 24 in the vehicle leads to decisions that require or trigger communication between the vehicle unit 3 and the central unit 1, as well as conditions that interrupt communication between the vehicle unit 3 and the central unit 1. For example, a selection of these decision conditions resulting from this status monitoring process 24 is identified by the reference symbols 254 to 29 and 31 and 32. Such conditions, which lead to decisions regarding the further procedure, are described below.

Step 25 checks to determine whether the destination has been reached or whether the process needs to be terminated manually, for example, due to a trouble message. If this inquiry is answered with "yes", the process is terminated at this point at step 26. If this question is answered by "no", step 27 is performed to send an inquiry, for example, whether the FCD module sees a traffic jam or a serious deviation between the actual current route and the calculated (determined) route.

If this inquiry is answered with "yes", step 30 is performed to determine if this is the first report of the traffic jam. If this is not the first report of the traffic jam, the wish for updating is automatically triggered in this example in step 34. In particular, data about the current route, possibly also history data about past routes, are transmitted from the vehicle unit 3 to the central unit 1. In FIG. 3, the automatic triggering of an update is performed in step 34, followed by step 35 to provide a response from the central unit 1.

If the FCD module 5 (FIG. 1) does not see a traffic jam or a significant difference between the current route and the desired route in step 27, other events can be checked. For example, step 28 is performed to check if the driver himself is reporting a traffic jam. If he is, an additional inquiry is performed in step 29 to determine whether the traffic jam is in the direction of travel, or in the opposite direction. If it is in the direction of travel, step 30 is then performed to determine if it is the first report of this driver reported traffic jam.

If in step 29 it is determined that the traffic jam is in the opposite lane of travel, the automatic triggering of the updating performed in step 34 is not required since the instantaneous route is not affected. Therefore, step 33 is performed so wish for updating is triggered only optionally. If the wish for updating is triggered, step 35 is performed to provide a response from the central unit 1.

If a traffic jam is not reported in step 28, step 31 is performed to determine if the driver wants to update his destination guidance. If he does, step 33 is performed followed by the appropriate response in step 35 and the recalculation of the route in step 23. If the driver does not want an update in step 31, step 32 is performed to determine if the reference point for updating has been reached. If it has, step 33 is performed. If it has not, operation returns to step 25.

Although the present invention has been shown and described with respect to several preferred embodiments thereof, various changes, omissions and additions to the form and detail thereof, may be made therein, without departing from the spirit and scope of the invention.

What is claimed is:

1. A method of calculating a route for a vehicle between an instantaneous location and a destination location, comprising:

determining an instantaneous location of the vehicle and a destination location of the vehicle, to produce current route data;

transmitting said current route data over a wireless communication network to a central unit;

receiving traffic information from the central unit over the wireless communication network;

processing said traffic information and said current route data to calculate processed route data indicative of a route between the instantaneous and destination locations of the vehicle; and providing said processed route data to a driver of the vehicle.

2. The method of claim 1, further comprising:

transmitting a traffic information request over the wireless communication channel to the central unit for updated traffic information.

3. The method of claim 2, wherein said step of transmitting said traffic information request is performed in response to a request from the driver.

4. The method of claim 2, wherein said step of transmitting said traffic information request is performed in response to automatically detecting that the vehicle has reached a predetermined location along the route indicated by said processed route data.

5. The method of claim 2, comprising:

regularly comparing the current location of the vehicle against the route indicated by said processed route data, to detect when the vehicle has deviated from the route indicated by said processed route data, and initiating said step of transmitting said traffic information request when a deviation is detected between the actual vehicle route and the route indicated by said processed route data.

6. The method of claim 2, wherein said step of determining said instantaneous location of the vehicle comprises receiving a vehicle position signal from a GPS unit located within the vehicle.

7. The method of claim 2, wherein said step of determining said instantaneous location of the vehicle comprises receiving a vehicle position signal from a navigation unit located within the vehicle.

8. The method of claim 7, comprising:

comparing the current location of vehicle with the processed route data; and providing an indication to the driver when the current location of the vehicle is not along the route specified by said processed route data.

9. The method of claim 1, comprising:

automatically detecting a traffic jam, and in response to a detected traffic jam transmitting traffic information data indicative of the traffic jam over the wireless communication network to the central unit.

10. A motor vehicle navigation system that receives route information from a central unit over a wireless communication network, said navigation system comprising:

means for determining instantaneous location data of the motor vehicle, and for determining a destination location of the vehicle, to produce current route data;

a wireless transmitter that transmits said current route data over the wireless communication network to the central unit;

a receiver that receives traffic information from the central unit over the wireless communication network;

means for processing said traffic information and said current route data to calculate processed route data indicative of a route between the instantaneous and destination locations of the vehicle;

means for providing said processed route data to a driver of the vehicle; and means for monitoring the progress of the vehicle along said route, and for transmitting traffic information data indicative of the progress of the vehicle along said route over the wireless communication network to the central unit.

11. The method of claim 10, further comprising:

means for transmitting a traffic information request over the wireless communication channel to the central unit for updated traffic information in response to a request from a vehicle occupant.

12. The method of claim 10, further comprising:

means for transmitting a traffic information request over the wireless communication channel to the central unit for updated traffic information in response to automatically detecting that the vehicle has reached a predetermined location along the route indicated by said processed route data.

13. A motor vehicle navigation system that receives route information from a central unit over a wireless communication network, said navigation system comprising:

a motor vehicle navigation unit that calculates route data indicative of route between an initial location of a motor vehicle and a destination location of the vehicle;

means for providing said route data to a driver of the vehicle; and means for regularly monitoring the progress of the vehicle along the route, and for automatically transmitting local traffic information data indicative of the progress of the vehicle along said route over the wireless communication network to the central unit in response to detecting a traffic jam;

a receiver that receives route traffic information from the central unit over the wireless communication network; and means for automatically calculating an updated route between a current location of the motor vehicle and the destination location, and for transmitting said updated route to said means for providing for presentation to the driver of the vehicle.

* * * * *

UNITED STATES PATENT AND TRADEMARK OFFICE
CERTIFICATE OF CORRECTION

PATENT NO. : 6,853,915 B2
DATED : February 8, 2005
INVENTOR(S) : Hubschneider et al.

It is certified that error appears in the above-identified patent and that said Letters Patent is hereby corrected as shown below:

<u>Column 7,</u>
Line 36, delete "254" insert -- 25 --

Signed and Sealed this

Tenth Day of May, 2005

JON W. DUDAS
*Director of the United States Patent and Trademark Office*